3,692,600
HIGH TEMPERATURE-RESISTANT PROPELLANTS
David C. Sayles, Huntsville, Ala., assignor to the United
States of America as represented by the Secretary of
the Army
No Drawing. Filed Dec. 5, 1969, Ser. No. 885,394
Int. Cl. C06d 5/06
U.S. Cl. 149—19                    2 Claims

ABSTRACT OF THE DISCLOSURE

A novel compound, polybutadieneimine, serves as a crosslinking agent or chain-extending agent for carboxyl-terminated polybutadiene prepolymer or hydrogenated carboxyl-terminated polybutadiene prepolymer. The cross-linked prepolymer is used in conjunction with aluminum as the metal fuel, ammonium perchlorate as the inorganic oxidizer, and other additives to form a high temperature-resistant propellant. The chain-extended prepolymer is used in a like manner with the specified propellant ingredients.

BACKGROUND OF THE INVENTION

The prior art has employed polybutadiene for use in combination with the tri(aziridinyl)phosphine oxide and sulfide which compounds are depicted by the illustration as follows:

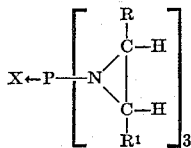

wherein X is selected from the group consisting of oxygen and sulfur, P is phosphorous, R, and $R^1$ are radicals containing up to a total of 20 carbon atoms selected from the group consisting of hydrogen, alkyl, cycloalkyl, aryl, alkaryl, and aralkyl radicals and R, and $R^1$ can be the same or unlike.

U.S. Patent 3,087,844 issued to P. S. Hudson et al. on Apr. 30, 1963 is concerned with solid composite propellants and the curing of the same with aziridinyl curing agents. Hudson et al. teaches that certain polymers (e.g., conjugated dienes containing from 4 to 12 carbon atoms and preferably 4 to 8 carbon atoms such as 1,3-butadiene, isoprene, and the like, and in addition, conjugated dienes containing reactive substituents along the chain, such as for example, halogenated dienes) are admixed with a phosphine compound, tris(aziridinyl)phosphine oxide or sulfide, and an inroganic oxidizing salt. After mixing the mixture is suitably increased in temperature so that reaction occurs between the polymer and the phosphine compound to yield a solid propellant structure.

The exact chemistry of the prior art and current employed processes of the type set forth are not completely understood. However, those skilled in the art recognize that certain competing reactions are encountered when aziridinyl compounds, such as, tris(methylaziridinyl) phosphine oxide and/or sulfide, are used to crosslink carboxylated polybutadiene prepolymers. When the reaction occurs in admixture, the competing reactions are more numerous because of the presence of other propellant ingredients. The competing reactions may cause excessive number of sites to be formed which can undergo oxidation reactions. It is necessary in a high temperature-resistant propellant that the ingredients be bound with a binder having the necessary crosslink sites to impart strength. However, sites which are not involved in crosslink, but which may undergo oxidation to produce a reduction in the mechanical properties of the propellant are undesirable sites.

The object of this invention is to provide a novel cross-linking agent which is closely related to the binder material structurally and which will undergo ready reaction with the binder material, and impart high temperature-resistant characteristics to the propellant system.

Another object of this invention is to provide a modified polybutadiene crosslinking agent which can be selectively absorbed on the surface of an oxidizer employed in a propellant composition to provide a protective coating and reduce incompatibility of the oxidizer with the other propellant ingredients.

SUMMARY OF THE INVENTION

Polybutadiene is changed to an aziridinyl compound (polybutadieneimine) by a series of reactions including: (1) reacting polybutadiene with equimolar quantities of a haloisocyanate in an ethereal solution to form a polybutadiene haloisocyanate; (2) converting the polybutadiene haloisocyanate thus formed by heating gently (e.g., 160°–180° F.) with an appropriate alcohol using sodium or lithium alkoxide as catalyst to form the halocarbamate of the polybutadiene; (3) refluxing the halocarbamate with 1.5 normal sodium hydroxide in methanol to form the polybutadieneimine.

The polybutadieneimine may be recovered by solvent extraction using an inert organic solvent (e.g., diethyl ether, ethyl acetate or the like) followed by solvent removal after which the polybutadieneimine is ready for use.

The polybutadieneimine is used to crosslink carboxylated polybutadiene in a propellant composition to produce a high temperature-resistant propellant. The propellant composition is comprised of polybutadieneimine, aluminum powder, ammonium perchlorate, carboxyl-terminated polybutadiene, ferrocene, dibutylcarbitol formal, and optional additives, lecithin, etc.

When two moles of a haloisocyanate, are used for each mole of polybutadiene, a chain-extending agent is produced since two aziridinyl functional groups per molecule of polybutadiene are introduced. The chain-extending agent may be used in curing a propellant to achieve desired physical properties. An illustration of the chain-extending function of polybutadieneimine is set forth later herein.

An added feature of polybutadieneimine is derived when mixed with ammonium perchlorate of the propellant mix. The modified butadiene appears to be selectively absorbed on the surface of ammonium perchlorate. When caused to undergo homopolymerization through the unsaturated linkages, the polybutadieneimine provides an encapsulated protective coating to reduce the incompatibility of the ammonia perchlorate with the other ingredients of the propellant.

DESCRIPTION OF THE PREFERRED EMBODIMENTS

An ethereal solution of iodine isocyanate can be prepared from the reaction of iodine with silver isocyanate in ether. When the reaction is carried out in the presence of polybutadiene the iodine isocyanate thus formed reacts rapidly with polybutadiene. The course of reaction can be followed easily since the paling of the brown iodine color indicates gradual depletion of the reactant, iodine isocyanate.

Reaction (1), wherein the isocyanate group is introduced into the butadiene, is illustrated as follows:

The structure, 

represents a monomeric unit of polymerized 1,3-butadiene.

(1) 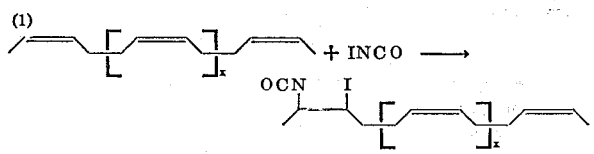

(Where X is poly-monomeric units)

The product of reaction (1) when reacted with an alcohol, represented by ROH (wherein R=lower alkyls), yields polybutadiene iodocarbamate depicted as follows:

(2) 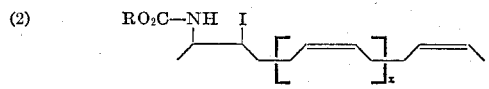

When product (2) is refluxed with 1.5 normal aqueous sodium hydroxide in methanol, the product polybutadieneimine is produced which is depicted as follows:

(3) 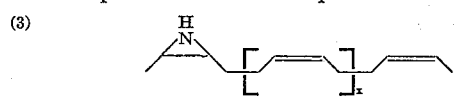

Structure (3) is useful as a crosslinking agent which is illustrated by illustration (5) below.

The preceding equations depict the series of reactions wherein equimolar quantities of reactions are used. By using two moles of a haloisocyanate for each mole of polybutadiene, two aziridinyl functional groups per molecule are introduced. The resulting structure is illustrated as follows:

(4) 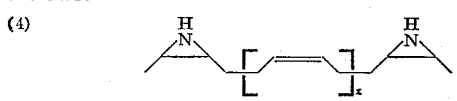

Structure (4) is useful as a chain-extending curing agent which is illustrated by illustration (6) below.

The polybutadieneimine, structure (3), is reacted with carboxyl-terminated polybutadiene to provide a crosslinking function, illustrated as follows:

(5) 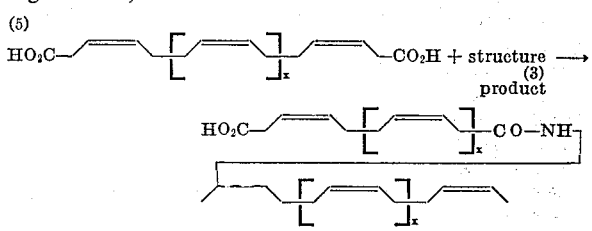

When structure (4) product is substituted for structure (3) product in reaction (5), a reaction product useful as a chain-extending curing agent is formed. The chain-extending function is illustrated as follows:

(6) 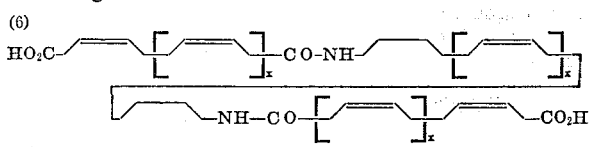

The haloisocyanate employed may be selected from the isocyanates containing iodine, bromine, chlorine, or fluorine. A bromo- or iodoisocyanate is preferred since the reaction with butadiene may be accomplished under less harsh conditions (e.g., at lower temperature in range of 160° F. to 180° F. and under near atmospheric pressure conditions. When a fluoro- or a chloroisocyanate is used, the reaction proceeds at a much lower rate unless considerably higher temperatures (e.g., in range of about 210° F. to 280° F.) are used. The suggested temperature ranges are indicative of the reaction conditions required for the respective halogen systems. A pressurized system generally would be required for use in the higher temperature ranges. The employment of a pressurized system results in greater complexities where components of higher volatilities are involved. Such complexities relate to solvent recovery, heat exchange, and require more elaborate production facilities, in general, than would otherwise be required.

The molar ratio of the reactant, polybutadiene, to the reactant, the selected haloisocanate, may range from a ratio of about 1/1 to about 1/4. The preferred range for producing a crosslinking agent and an encapsulation agent for the ammonium perchlorate being 1/1. Encapsulation occurs when the compound, polybutadieneimine, homopolymerizes through the unsaturated linkages of the specified compound. The use of a molar ratio of 1 polybutadiene to 2 of the selected haloisocyanate is preferred when a chain-extended product is intended to be produced.

Example 1, below, sets forth a control propellant and a novel propellant composition of the invention in which polybutadieneimine (aziridinylpolybutadiene) is employed as a crosslinking agent with a carboxyl-terminated polybutadiene prepolymer to produce a high temperature-resistant binder. Because of the unique characteristics of the aziridinylpolybutadiene, the epoxy resin or tris(methylaziridinyl) phosphine oxide curing agent normally used as the curing agent or crosslinking agent is not included in the propellant composition. Also, the amount of the carboxyl-terminated polybutadiene prepolymer used in the preparation of the propellant can be reduced because the novel compound, polybutadieneimine (aziridinylpolybutadiene), contains polybutadiene groups comparable to the binder.

When a tri-(aziridinyl) phosphine oxide or a tri-(aziridinyl) phosphine sulfide is replaced by aziridinylpolybutadiene, a distinct advantage is obtained. The additional and undesirable reaction sites due to the phosphine oxide and/or phosphine sulfide portions of the pertinent compounds undergo various side reactions, and these do not occur when aziridinylpolybutadiene is used in place of the tri(aziridinyl)phosphine oxide or the tris(aziridinyl) phosphine sulfide. In addition, because of the stereochemical interference effects, the aziridinylpolybutadiene is less susceptible to other competing reactions which are encountered when the aziridinyl phosphine oxide or phosphine sulfides are used for crosslinking polybutadiene prepolymers.

The autoignition temperature is compared for the control and the novel propellant, and the results are set forth under Example I. The results indicate that the novel propellant containing the aziridinylpolybutadiene is far more resistant to heat than the control propellant which does not contain the specified compound. The increased resistance to heat wherein the time for autoignition of the novel propellant is prolonged may be due to a combination of contributing factors. Such factors may be related to the encapsulations of the ammonium perchlorate oxidizer and minimization of reaction sites within the propellant binder systems whereby decomposition prior to autoignition is lessened.

EXAMPLE I

| Ingredient | Weight percent Control propellant | Weight percent Novel propellant |
|---|---|---|
| NH₄ClO₄ | 68.0 | 68.0 |
| Carboxyl-terminated polybutadiene prepolymer | 10.9 | 6.5 |
| Tris-(methylaziridinyl)phosphine oxide | 1.0 | |
| O,N,N-tris(epoxypropyl)-p-aminophenol (epoxy resin curing agent) | 1.0 | |
| Aziridinylpolybutadiene | | 6.5 |
| Aluminum | 16.0 | 16.0 |
| Iron linoleate | 0.1 | |
| Ferrocene | 1.0 | |
| Dibutylcarbitol formal | 2.0 | 2.0 |
| Total | 100.0 | 100.0 |
| Autoignition temperature (time for 10-gram sample to ignite at 350° F.) minutes | 50 | 120 |

Polybutadieneimine is used in amounts from about 5 to about 10 percent by weight of the propellant composition. The ranges of the other propellant ingredients, in percent by weight of the propellant composition, are as follows: $NH_4ClO_4$ 64–72, carboxyl-terminated polybutadiene prepolymer 5–15, aluminum 10–20, dibutylcarbitol formal 1–3, and ferrocene 0.5–2.

The control propellant and novel propellant were each mixed, cast, and cured in a like manner by techniques known in the art.

A typical procedure for mixing the propellants is to blend a portion of the ammonium perchlorate oxidizer in the polybutadiene binder to produce a paste. Next, the ballistic modifiers and additives (e.g., ferrocene, dibutylcarbitol formal, iron linoleate, etc.) are added to the paste at 140° F. followed by the addition of the aluminum and the remainder of the ammonium perchlorate. The remainder of the ammonium perchlorate and aluminum are added slowly in increments with good mixing between additions in a vertical mixer under reduced pressure. Finally, the curing agents, crosslinking agents, chain-extending agent, and any other optional additives are added to the propellant which is given an additional 1 hour mix under reduced pressure at 140° F. The propellant is cast into a suitable mold and cured at 140° F. for about 24 hours. The cured propellants are tested to determine properties of heat resistance as noted under Example I above.

The aziridinylpolybutadiene of this invention may be used to replace the curing agent such as the epoxy resin illustrated hereinabove, the phosphine oxide compound or the phosphine sulfide compound noted herein, and a portion of the carboxyl-terminated polybutadiene prepolymer. The quantity of aziridinylpolybutadiene used in propellants may vary from about 5 to about 10 weight percent of the total propellant weight. The quantity employed depends on the requirement such requirement being related to the physical strengths, specific impulse, burning rates etc. needed in the finished propellant. An improvement in the propellant binder is significant relative to the properties required for resistance to high temperature exposure. Since propellants may be subjected to wide high ranges of temperatures, the ability to withstand a high temperature for a longer period of time without autoignition provides a significant safety factor. Also, since reactive sites not required for crosslinking are minimized or absent altogether in the novel propellant binder, the stability of the novel propellant when stored or used will be far greater than the stability of a propellant which has excessive reactive sites within the propellant binder. The excessive reactive sites could easily result in decomposition in the propellant matrix. Any decomposition within a propellant matrix would be detrimental to the expected results when the partially decomposed propellant charge is used in a missile or other structure having high demands for reproducibility in performance.

I claim:

1. A high temperature-resistant propellant composition comprising ammonium perchlorate, carboxyl-terminated polybutadiene prepolymer, aluminum, ferrocene, dibutylcarbitol formal and polybutadieneimine prepared by the process steps of reacting polybutadiene and a haloisocyanate in a molar ratio of polybutadiene of about 1 to a molar ratio of haloisocyanate which can vary from about 4 to about 1 in an ethereal solution to form a polybutadiene haloisocyanate; converting the polybutadiene haloisocyanate thus formed by heating in the range of 160° F.–280° F. with an alkyl alcohol and in the presence of a catalyst selected from sodium and lithium alkoxide to form the halocarbamate of polybutadiene; refluxing said halocarbamate of polybutadiene in a methanol solution of sodium hydroxide to form polybutadieneimine; and recovering the polybutadieneimine thus formed; said polybutadieneimine being present in an amount in the range from about 5 to about 10 percent by weight of said composition; said ammonium perchlorate being present in an amount in the range from about 64 to about 72 percent by weight of said composition; said carboxyl-terminated polybutadiene prepolymer being present in an amount in the range from about 5 to about 15 percent of said composition; said aluminum being present in an amount in the range from about 10 to about 20 percent by weight of said composition; said ferrocene being present in an amount in the range from about 0.5 to about 2 percent by weight of said composition; and said dibutylcarbitol formal being present in an amount in the range of from 1 to about 3.0 percent by weight of said composition.

2. The high temperature-resistant propellant composition specified in claim 1 wherein said polybutadieneimine is present in an amount of about 6.5 percent by weight of said composition, said ammonium perchlorate is present in an amount of about 68 percent by weight of said composition, said carboxyl-terminated polybutadiene prepolymer is present in an amount of about 6.5 percent by weight of said composition, said aluminum is present in an amount of about 16 percent by weight of said composition, said ferrocene is present in an amount of about 1.0 percent by weight of said composition, and said dibutylcarbitol formal is present in an amount of about 2.0 percent by weight of said composition.

No references cited.

BENJAMIN R. PADGETT, Primary Examiner

U.S. Cl. X.R.

149—20